8432X
No Printed Specification Available
W. C. Johnston,
Horse Power.
Patented Oct. 4, 1834.
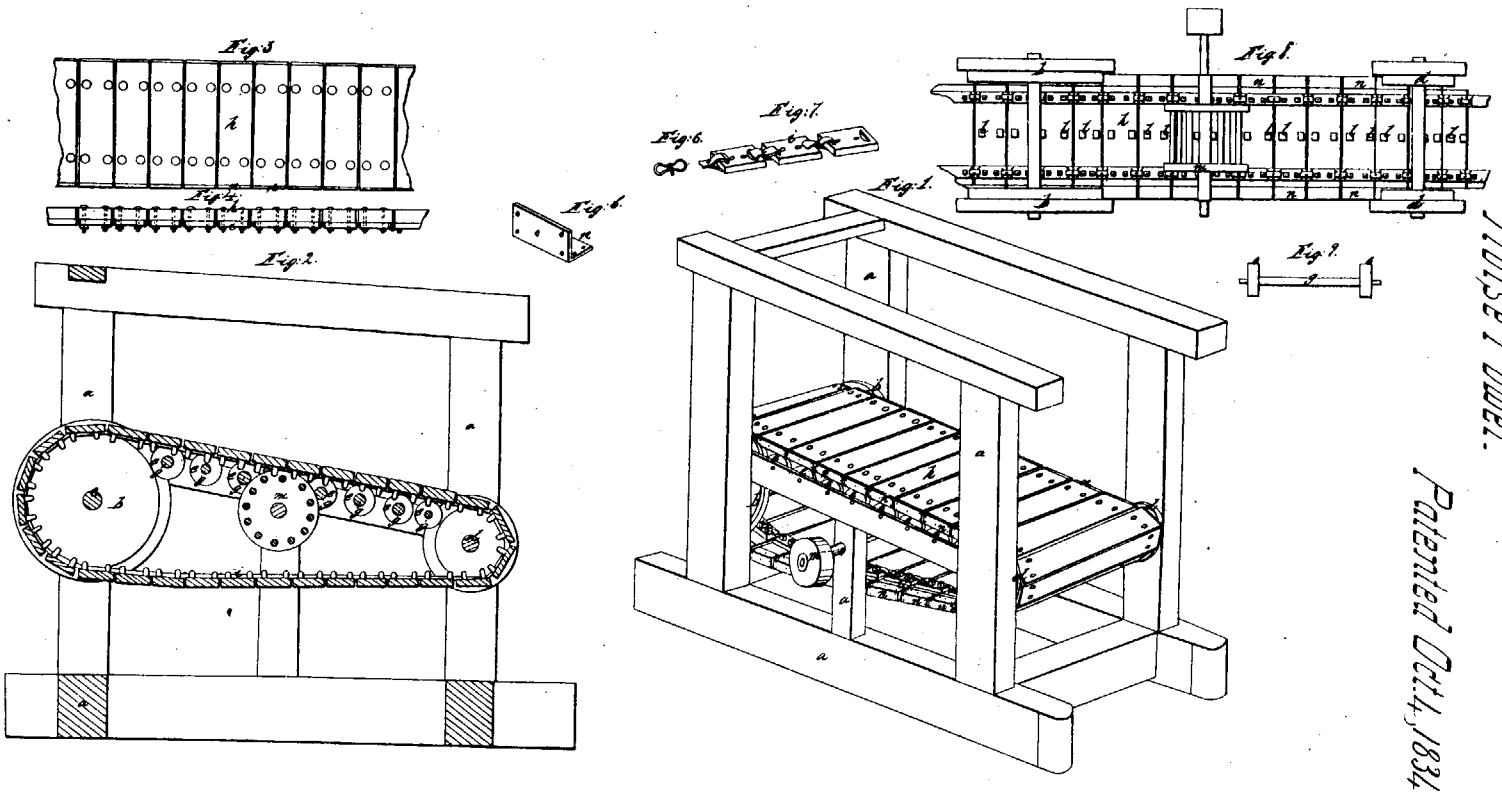
A. PHOTO-LITHO. CO. N.Y. (OSBORNE'S PROCESS.)

William G. Johnston, Bridgetown N. J.

Letters Patent.

The Schedule referred to in these Letters Patent, and making part of the same, containing a description in the words of the said William G. Johnston, himself of his improvement, being a Machine for propelling machinery called Johnstons inclined plane Horse power.

Be it Known that I, William G. Johnston of Bridgetown in the County of Cumberland, and State of New Jersey have invented a new and useful improvement in the useful arts; being a machine for propelling Machinery called Johnstons Inclined plane Horse power; which is as described as follows.

I make a frame, say nine feet long, two feet wide, (or of any convenient size) at each end and within this frame, are placed two heads or cylinders made in the following manner.— Take a piece of wood say twenty inches in diameter, two inches thick, with the periphery of the wheel made there-[illegible] down to a [illegible] inch in thickness, and banded with iron. Two of these heads or cylinders are placed on a shaft so as to reach the outer edge of the revolving floor hereafter described. At the other or lower end of the frame, I make two similar cylinders, but of ten inches diameter, of wood, iron or any suitable material; they are placed at the end and within the frame before described, on a line so as to form on the periphery of the wheels or cylinders an inclined plane at an angle of about ten degrees, or as may be convenient. Upon the inner side of the inclined plane, and at proper distances apart, frie-
tion friction wheels are placed of four inches diameter,
or of any convenient size; these are placed one on each
end of a shaft, secured by boxes to a plank forming the
inclined plane, running on a line with the wheels or
heads or cylinders at the ends of the frame first [illegible]
described. The parts forming the revolving platform,
or stepping floor, I make as follows;— Two continued
or endless chains are made from pieces of iron, or
other material, with the straps joined together by [illegible]
links forming joints or hinges, four inches long each,
or as may be convenient. I prepare plank, say four
inches wide, fourteen inches long, and of proper [illegible]
thickness, and secure them to the endless chains by screws
or rivets, parallel and close to each other. In or near
the middle and inside, I place one or more cogs in
each plank working in a trundle head on the end of
a horizontal shaft across the frame, and on the outer
ends of each plank I put pieces of iron the width of the
plank, bent at right angles to form a band or rail.
The revolving floor is placed within the frame, and
over the cylinders and friction wheels.— The band or
rail passing over the friction wheels and cylinders.
The cogs in the plank forming the revolving floor,
operate upon the trundle head or wallower which
is secured immediately beneath the floor; motion
being given to the inclined revolving floor, by the
power of the animal treading thereon, in the manner
of common inclined horse wheels. This communi-
cates motion to the horizontal shaft in the centre
of the trundle head; and this again conveys the
motion to any machine required.
For a further illustration of my inven-
-tion, I refer to the model and drawing of the
same same deposited in the patent office.

What I claim as my invention and desire to secure by Letters Patent; is the combination and arrangement of the several parts of the machine, and the mode of applying the gearing by which the motion is obtained and communicated to all kinds of machinery in the manner herein before specified and described.

Witnessed
S. P. Powers
Joseph Gibson

William B. Johnston

700 [illegible]

(Drawing in Portfolio)